United States Patent [19]
Roskowski et al.

[11] Patent Number: 5,640,599
[45] Date of Patent: Jun. 17, 1997

[54] INTERCONNECT SYSTEM INITIATING DATA TRANSFER OVER LAUNCH BUS AT SOURCE'S CLOCK SPEED AND TRANSFERING DATA OVER DATA PATH AT RECEIVER'S CLOCK SPEED

[75] Inventors: Steven G. Roskowski, Sunnyvale; Dean M. Drako, Los Altos; William T. Krein, San Jose, all of Calif.

[73] Assignee: Apple Computer, Inc., Cupertino, Calif.

[21] Appl. No.: 210,733

[22] Filed: Mar. 18, 1994

Related U.S. Application Data

[63] Continuation of Ser. No. 816,346, Dec. 30, 1991, abandoned.

[51] Int. Cl.⁶ .................... G06F 13/00; G06F 13/38; G06F 13/40; G06F 13/42
[52] U.S. Cl. .................... 395/849; 395/851; 395/853; 395/286; 395/308
[58] Field of Search ................... 395/831, 827, 395/840, 841, 847, 853, 872, 881, 250, 285, 286, 306, 308, 849, 851

[56] References Cited

U.S. PATENT DOCUMENTS

| | | | |
|---|---|---|---|
| 3,109,162 | 10/1963 | Wolensky | 340/172.5 |
| 4,145,755 | 3/1979 | Suzuki et al. | 364/900 |
| 4,276,611 | 6/1981 | Jansen et al. | 395/280 |
| 4,402,040 | 8/1983 | Evett | 395/299 |
| 4,413,258 | 11/1983 | Quick et al. | 340/825.5 |
| 4,423,480 | 12/1983 | Bauer et al. | 395/280 |
| 4,525,849 | 7/1985 | Wolf | 375/372 |
| 4,527,233 | 7/1985 | Ambrosius, III et al. | 395/250 |
| 4,542,457 | 9/1985 | Mortensen et al. | 364/200 |
| 4,606,002 | 8/1986 | Waisman et al. | 364/200 |
| 4,620,278 | 10/1986 | Ellsworth et al. | 395/299 |
| 4,621,342 | 11/1986 | Capizzi et al. | 395/291 |
| 4,672,536 | 6/1987 | Giroir et al. | 364/200 |
| 4,683,534 | 7/1987 | Tietjen et al. | 395/307 |
| 4,766,536 | 8/1988 | Wilson et al. | 395/301 |
| 4,766,538 | 8/1988 | Miyoshi | 395/307 |

(List continued on next page.)

FOREIGN PATENT DOCUMENTS

| | | | |
|---|---|---|---|
| 0038189 | 10/1981 | European Pat. Off. | G06F 3/04 |
| 0121030 | 10/1984 | European Pat. Off. | G06F 3/04 |
| 0127007 | 12/1984 | European Pat. Off. | G06F 3/04 |
| 0141742 | 5/1985 | European Pat. Off. | G06F 13/00 |
| 0240749 | 10/1987 | European Pat. Off. | G06F 13/42 |
| 63-94358 | 10/1986 | Japan . | |
| 95593 | 3/1988 | Japan . | |
| 2-294755 | 5/1989 | Japan . | |
| 246664 | 10/1989 | Japan . | |
| 0127007 | 3/1984 | United Kingdom . | |
| 2256563 | 12/1992 | United Kingdom | H04L 12/56 |

OTHER PUBLICATIONS

Alok N. Choudhary, et al. "A Modified Priority Based Probe Algorithm for Distributed Deadlock Detection and Resolution", pp. 10–18, IEEE vol. 15, No. 1, Jan. 1989.

Forsberg, Chuck "The ZModem Inter Application File Transfer Protocol" by Chuck Forsberg—Omen Technology, Inc.; Oct. 27, 1987.

*Primary Examiner*—Thomas C. Lee
*Assistant Examiner*—D. Dinh
*Attorney, Agent, or Firm*—Blakely, Sokoloff, Taylor & Zafman

[57] ABSTRACT

A computer interconnect including a plurality of nodes, each node capable of joining to a component of a computer, each node including apparatus for transferring signals between the component and the node, apparatus for storing packets of data, apparatus for signalling each other node that a packet of data exists for transfer to a component associated with that node, apparatus for sensing signals from another node indicating that a packet of data exists for transfer to a component associated with that node, and apparatus for transferring packets of data stored at one node to the apparatus for transferring signals between the component and the node of another node.

72 Claims, 7 Drawing Sheets

U.S. PATENT DOCUMENTS

| | | | |
|---|---|---|---|
| 4,837,682 | 6/1989 | Culler | 395/294 |
| 4,860,193 | 8/1989 | Bentley et al. | 364/200 |
| 4,860,244 | 8/1989 | Bruckert et al. | 395/250 |
| 4,864,490 | 9/1989 | Nomoto et al. | 364/157 |
| 4,864,496 | 9/1989 | Triolo et al. | 364/200 |
| 4,878,166 | 10/1989 | Johnson et al. | 364/200 |
| 4,920,486 | 4/1990 | Nielsen | 395/291 |
| 4,924,380 | 5/1990 | McKinney et al. | 395/291 |
| 4,937,733 | 6/1990 | Gillett, Jr. et al. | 364/200 |
| 4,939,644 | 7/1990 | Harrington et al. | 395/825 |
| 4,953,081 | 8/1990 | Feal et al. | 364/291 |
| 4,956,771 | 9/1990 | Neustaedter | 395/872 |
| 4,965,723 | 10/1990 | Kirk et al. | 395/307 |
| 5,010,325 | 4/1991 | Ziuchkovski | 340/781 |
| 5,081,576 | 1/1992 | Ward | 395/325 |
| 5,088,024 | 2/1992 | Vernon et al. | 395/291 |
| 5,097,437 | 3/1992 | Larson | 398/778 |
| 5,111,424 | 5/1992 | Donaldson et al. | 395/297 |
| 5,113,369 | 5/1992 | Kinoshita | 395/307 |
| 5,151,994 | 9/1992 | Wille et al. | 395/800 |
| 5,155,404 | 10/1992 | Sadarangani | 310/125 |
| 5,167,019 | 11/1992 | Fava et al. | 395/200.2 |
| 5,179,557 | 1/1993 | Kudo | 370/412 |
| 5,191,653 | 3/1993 | Banks et al. | 395/275 |
| 5,193,149 | 3/1993 | Awiszio et al. | 395/200 |
| 5,193,197 | 3/1993 | Thacker | 395/303 |
| 5,210,829 | 5/1993 | Bitner | 395/250 |
| 5,218,676 | 6/1993 | Ben-Ayed et al. | 395/200.15 |
| 5,220,653 | 6/1993 | Miro | 395/677 |
| 5,222,223 | 6/1993 | Webb et al. | 395/467 |
| 5,265,215 | 11/1993 | Fukuda et al. | 395/303 |
| 5,291,468 | 3/1994 | Carmon et al. | 369/47 |
| 5,452,436 | 9/1995 | Arai et al. | 395/550 |
| 5,517,622 | 5/1996 | Ivanoff et al. | 395/200 |

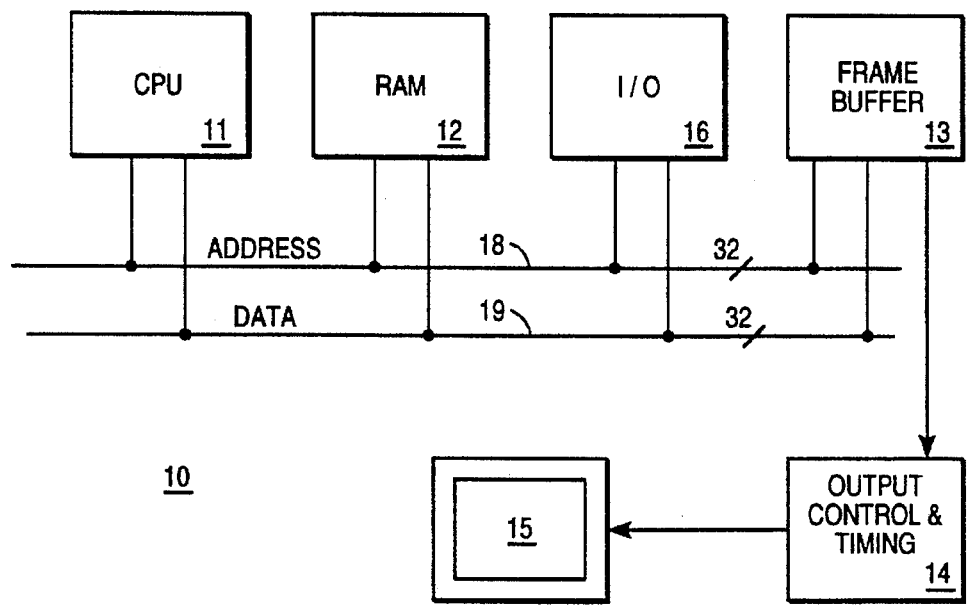
FIG_1
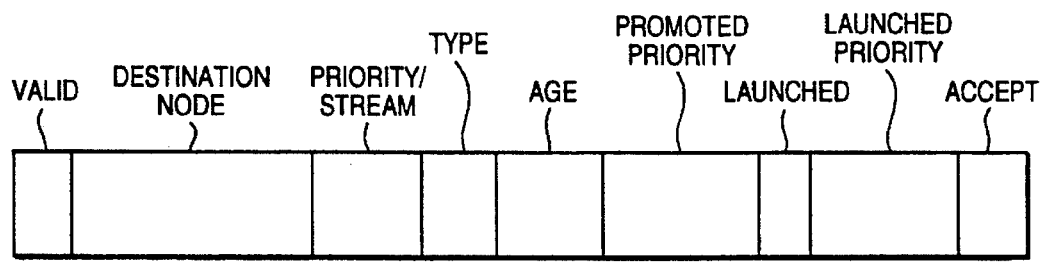
FIG_4

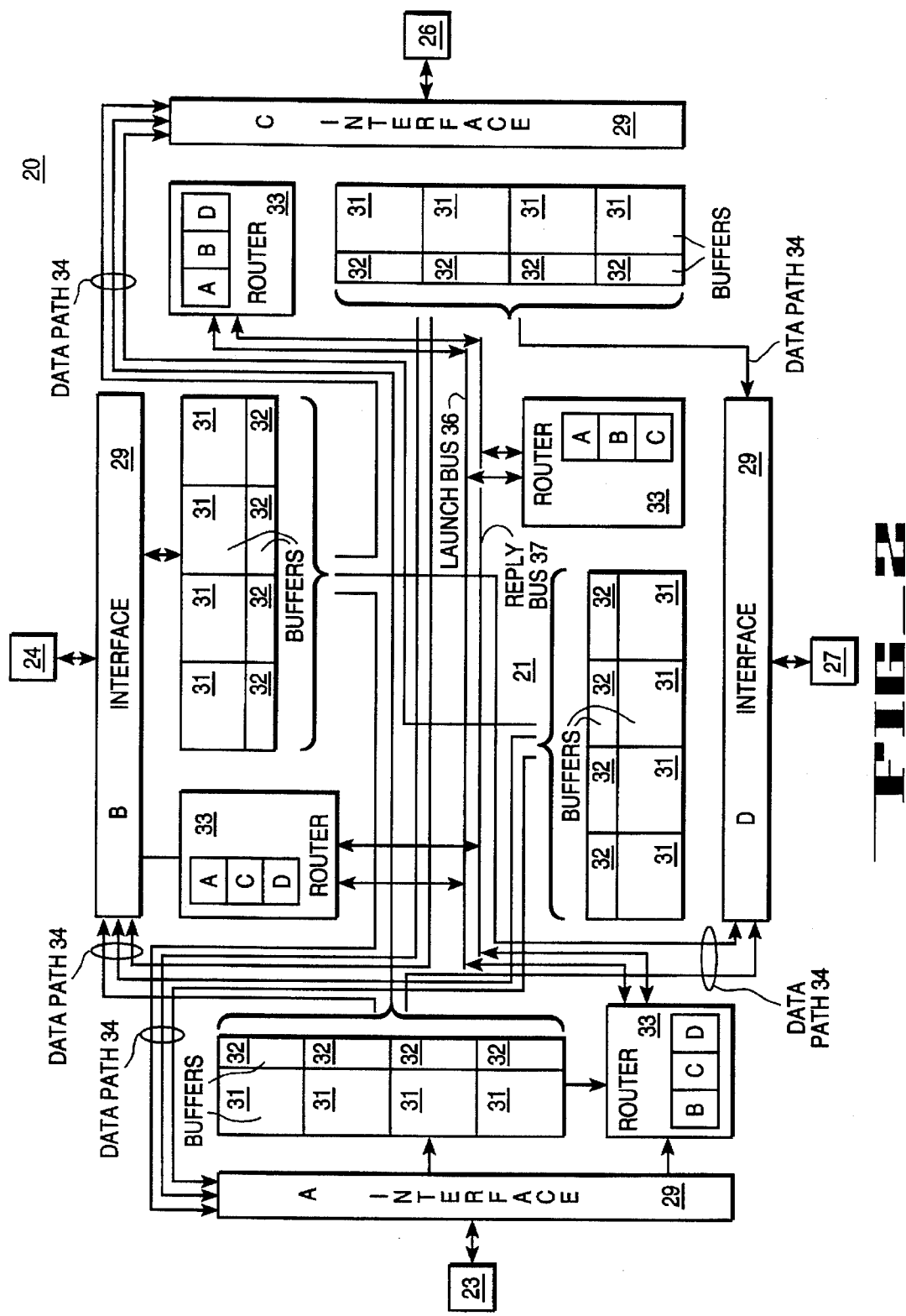
FIG_2

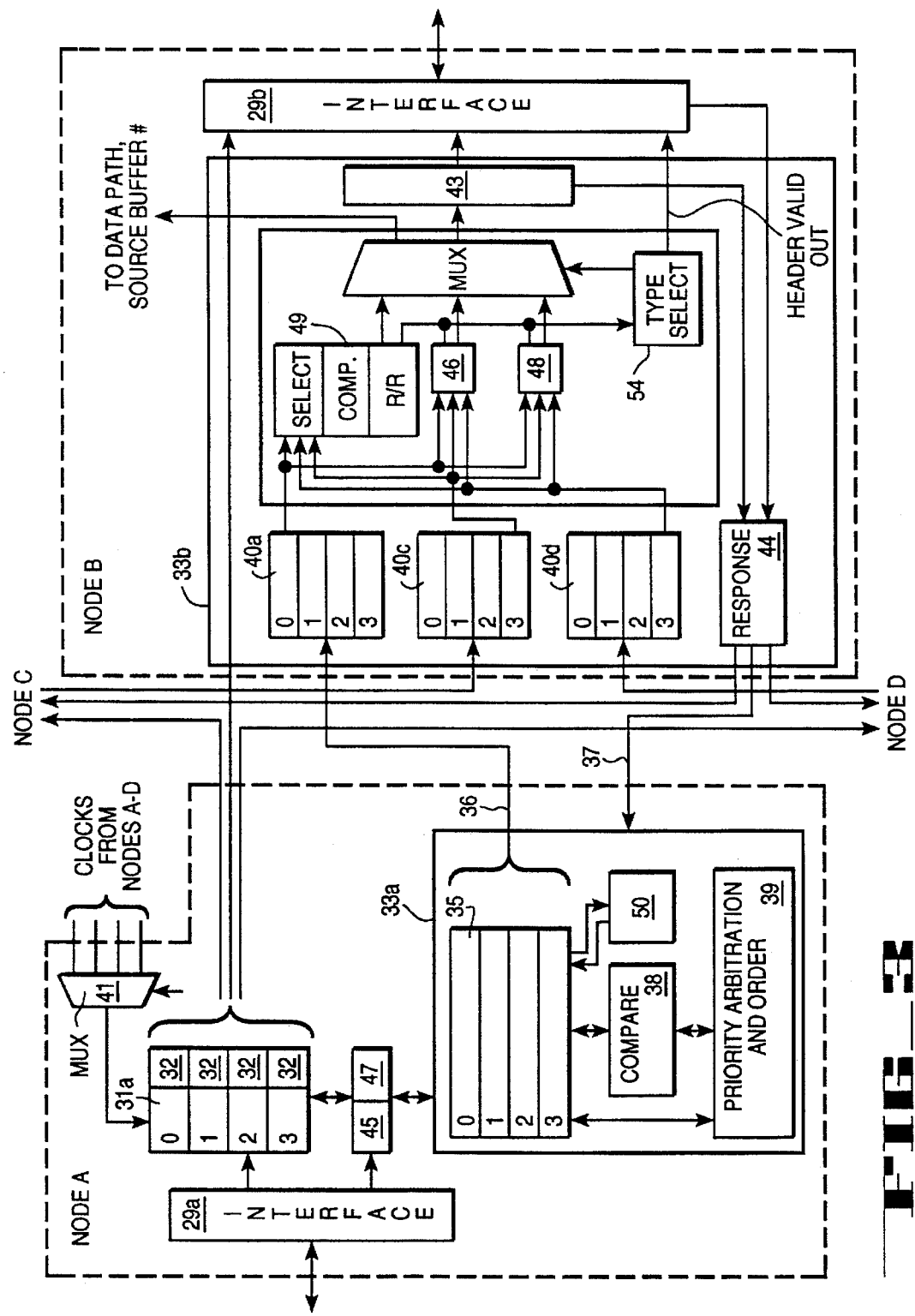
FIG_3

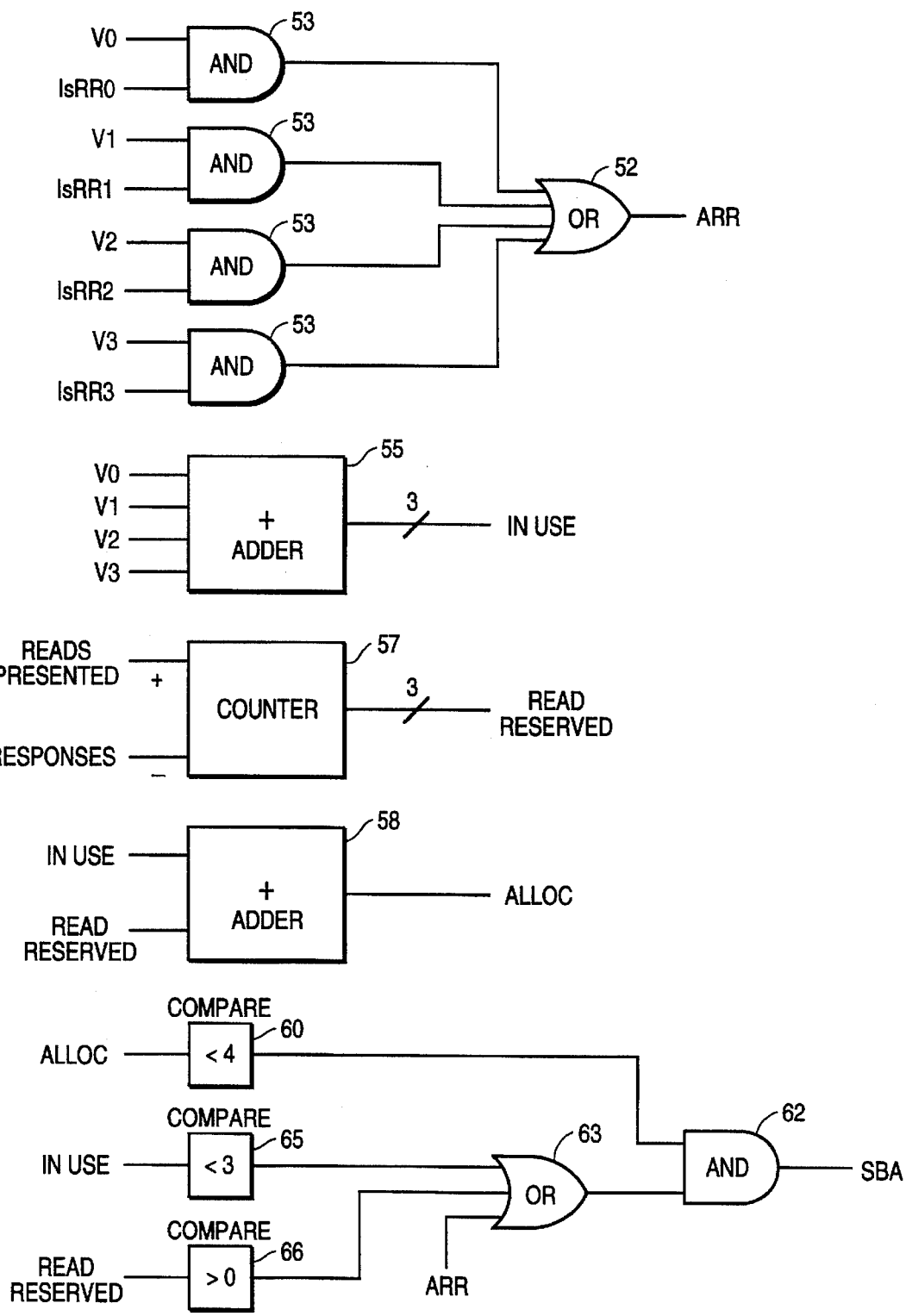
FIG_5

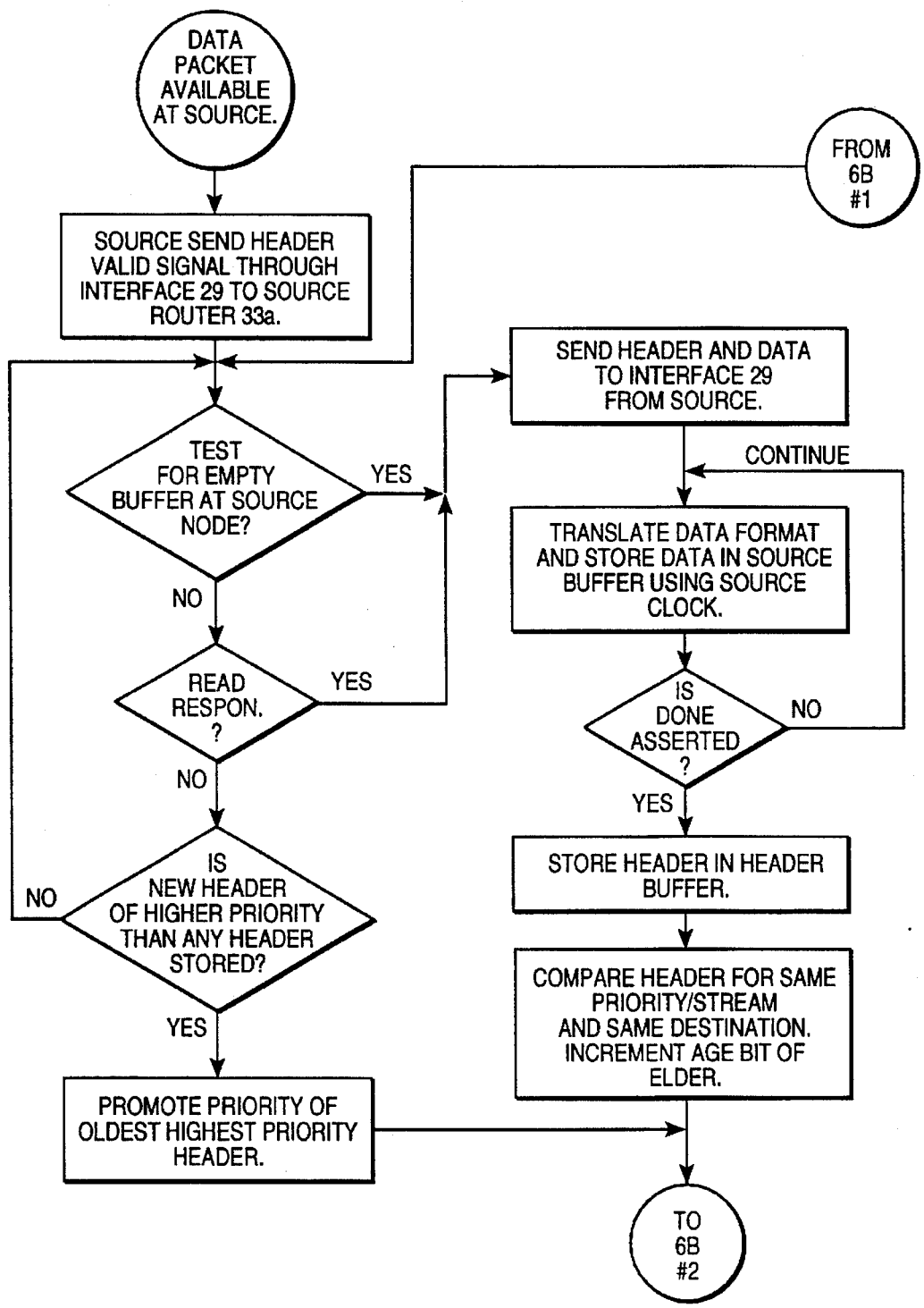
FIG_6A

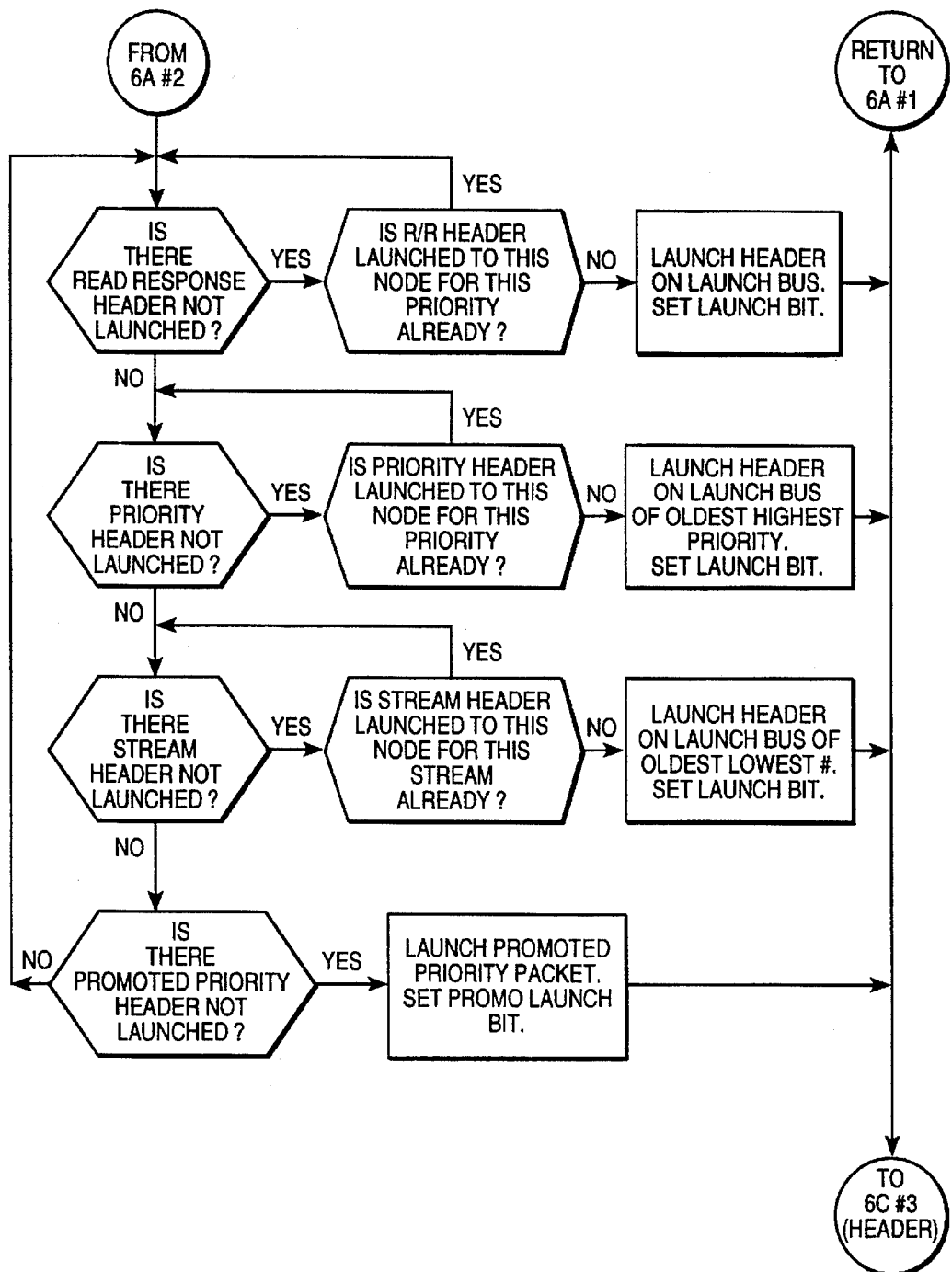
FIG_6B

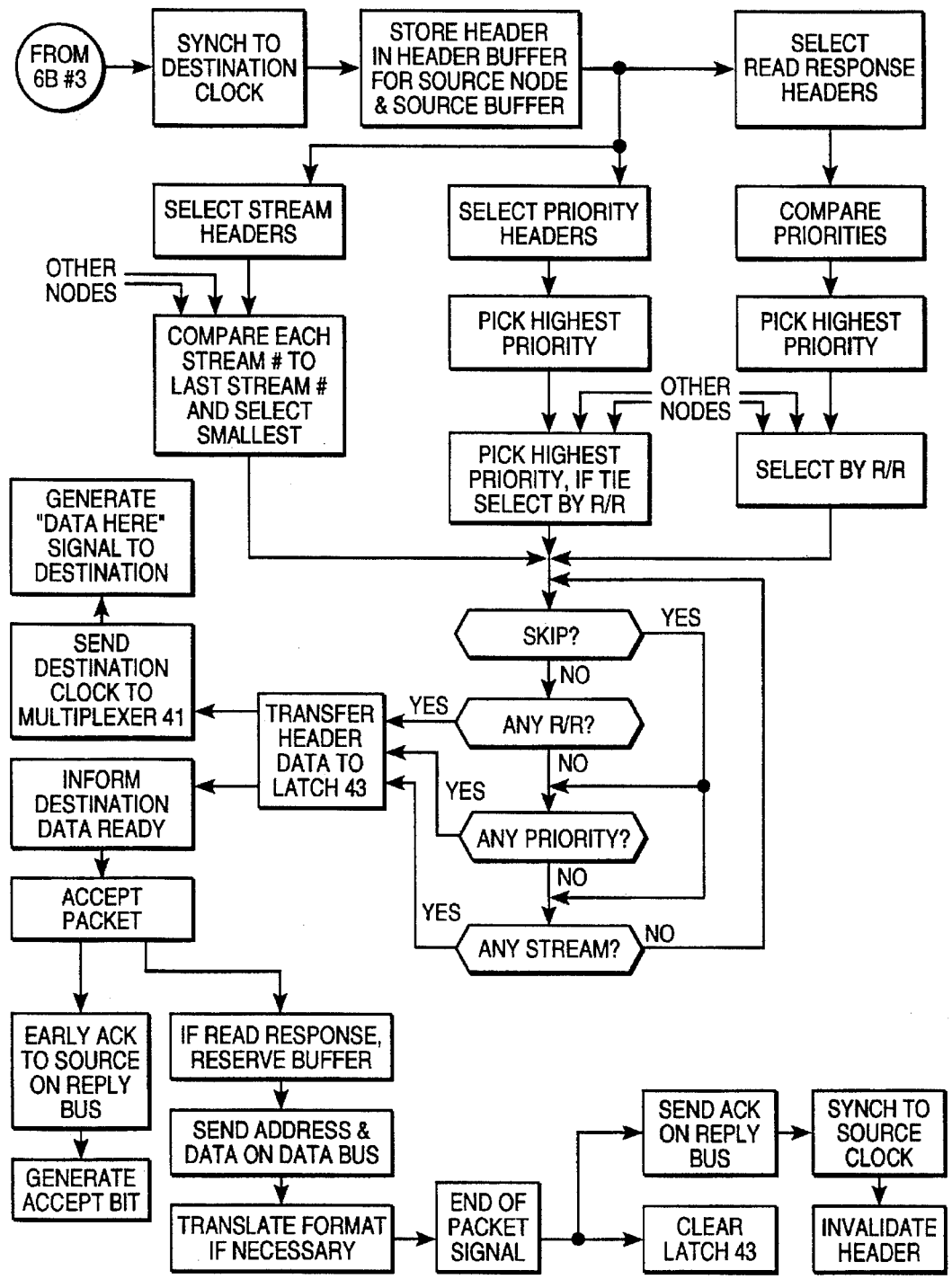
FIG_6C

INTERCONNECT SYSTEM INITIATING DATA TRANSFER OVER LAUNCH BUS AT SOURCE'S CLOCK SPEED AND TRANSFERING DATA OVER DATA PATH AT RECEIVER'S CLOCK SPEED

This is a continuation of application Ser. No. 07/816,346, filed Dec. 30, 1991, now abandoned.

BACKGROUND OF THE INVENTION

1. Field of the Invention

This invention relates to interconnection circuitry and, more particularly, to improved apparatus for handling data within a computer system in a manner that a plurality of data sources can transfer a very large amount of information to a plurality of destinations concurrently.

2. History of the Prior Art

The typical computer system utilizes a busing arrangement as the interconnection to transfer information from one component of the system to another. Such a busing arrangement often includes an address bus and a data bus. Each of these buses is made up of a number of conductors (for example, thirty-two) which physically connect to each of the major system components. For example, a central processor, main memory, a frame buffer, and an input/output controller may all connect to the system bus. When information is transferred between system components (for example, when information is written from a source component to a destination component), the source component signals that it has information ready for transfer. During the time that any particular component is utilizing the buses, they are unavailable for use by any other one of the components since all of the conductors of each bus available to carry either address or data information are occupied. Consequently, information may be written by only one source component or read by only one destination component at one time (although more than one destination component may receive information if more than one destination component can respond to the same address) since there is room for information from only one source component on the lines of the data or address buses. For this reason, some form of arbitration circuitry reviews all of the source components with information available for transfer and decides which component should be allowed to transfer information. In a write operation, the source component selected to transfer its information places an address indicating the destination on the address bus and the data to be transferred on the data bus. The destination component recognizes an address within its range of addresses and accepts the information available on the data bus. In the case of a read operation, the component desiring the information places an address indicating the source of the data on the address bus and waits for the data to be transferred to it on the data bus.

In the past, busing arrangements have sufficed for transferring information in the typical personal computer or work station. The typical manner of increasing the proficiency of the bus is to provide a wider data path and increase the clock speed. However, the requirements for pathways to handle more and more information faster have increased to the point that various functions cannot be performed economically by the typical busing arrangement. Functions such as the presentation of animated graphics and television require the transfer of so much information that the entire busing arrangement of present day systems must be devoted to their use. When it is desired to incorporate a number of these functions into the same computer system and to run a number of these operations simultaneously, a typical busing arrangement capable of handling the load becomes very difficult to design and very expensive to implement. For example, to operate at frequencies over approximately 25 megahertz, it is necessary to control the parasitic capacitance and the impedance of all devices connected to the bus very tightly and to substantially increase the size of the drivers used. This drastically increases the cost of designing devices and the complexity of the devices designed for use with the system. Moreover, it essentially eliminates the ability of the system to operate with inexpensive devices designed for earlier systems. Although the desired performance can be attained, increasing the size of the bus and the frequency of operation does not present a desirable cost/complexity tradeoff.

SUMMARY OF THE INVENTION

It is, therefore, an object of the present invention to increase the load handling abilities of a computer system.

It is another object of the present invention to increase the load handling abilities of a computer system using an economical arrangement which may be easily used with a great number of varying components.

It is another, more specific object, of the present invention to provide an improved complementary interconnection arrangement for a computer system.

It is an additional object of the present invention to provide a complementary interconnection arrangement for a computer system capable of handling concurrently information from a plurality of sources directed to a plurality of destinations.

It is another object of the present invention to provide a complementary interconnection arrangement for a computer system capable of handling concurrently information from a plurality of sources operating in different formats and directed to a plurality of destinations operating in different formats.

These and other objects of the present invention are realized in a computer interconnect comprising a plurality of nodes, each node being capable of joining to a component of a computer, each node comprising means for transferring signals between the component and the node, means for storing packets of data, means for signalling each other node that a packet of data exists for transfer to a component associated with that node, means for sensing signals from another node indicating that a packet of data exists for transfer to a component associated with that node, and means for transferring packets of data stored at one node to the means for transferring signals between the component and the node of another node.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram of a typical busing arrangement for a computer system constructed in accordance with the prior art.

FIG. 2 is a block diagram of an interconnect arrangement constructed in accordance with the present invention.

FIG. 3 is a more detailed block diagram of an interconnect arrangement constructed in accordance with the present invention.

FIG. 4 is a description of the general format of a header format used in a preferred embodiment of the invention.

FIG. 5 is detailed block diagram of a portion of the arrangement illustrated in FIG. 3.

FIGS. 6A, B, C are a flow charts illustrating the transmission of data using the interconnect of FIGS. 2 and 3.

NOTATION AND NOMENCLATURE

Some portions of the detailed descriptions which follow are presented in terms of representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Referring now to FIG. 1 there is illustrated a block diagram which sets forth in general detail the components of a typical computer system constructed in accordance with the prior art. The system 10 includes a central processing unit 11, random access memory 12, a frame buffer memory 13, output control and timing circuitry 14, an output display 15, and input/output circuitry 16. In general, each of the main components such as the central processing unit 11, the random access memory 12, the frame buffer memory 13, and the input/output circuitry 16 are joined together by connection to a system bus. A typical system bus may include an address bus 18 and a data bus 19. Each of the address bus 18 and the data bus 19 includes a plurality of conductors each connecting to all of the components on the bus in parallel. A common system bus today uses thirty-two individual lines for each of the data and address lines to connect individual components of the system.

A component such as the central processing unit 11 directs data to another component by placing the address to which the data is directed on the system address bus 18 and the data on the system data bus 19. An address may be represented by thirty-two bits of binary coded information all of which are represented by two state signals placed on the conductors of the address bus 18. In like manner, the data on the data bus 19 is represented by binary coded two state signals placed on the conductors of the data bus 19. Both the address and the data typically take all of the conductors of the address and data buses other than those used for control signals. Circuitry associated with the component which is the destination for the data recognizes an address on the address bus 18 within its range of addresses and, if free to receive data, accepts the data available on the data bus 19. Since each of the address and data buses is made up of a number of conductors which physically connect to each of the system components on the bus and all of the conductors of each bus carry the information related to this specific transfer, during the time that any particular source of information is utilizing the buses, the buses are unavailable for use by any other source. Consequently, data may be sent between only one source component and one destination component at a time.

Thus, the passive bus architecture just described limits the speed at which data may be transferred both within and external to a computer system. For this reason, some other form of architecture seems desirable where very large amounts of data are to be transferred.

There are a number of problems faced in designing a new interconnect in addition to those directly related to the speed of transfer. One problem which must be faced in designing a new interconnect for a high speed computer is that the individual components of a computer system often function more efficiently at different operational frequencies. For example, a processor may have an internal clock operating at a first fixed rate while a frame buffer may naturally move information to a display at another radically different rate. It is very desirable that such components operate at their natural operational rates; this usually simplifies their design, lowers the system cost, and improves performance. Many prior art designs for system interconnects have themselves had some fixed operational frequency, usually different from that of any other component. However, whenever components which operate in response to different clock frequencies are associated in a system, it is necessary to synchronize the transfer of signals from one component to another. If this transfer proceeds through an interconnect architecture operating at its own operational frequency such as was just discussed, a first synchronization between the first component and the interconnect and a second synchronization between the interconnect and the second component are required. This double synchronization process can slow the system significantly.

Another problem faced in designing an interconnect is caused by the fact that when a computer is connected to a peripheral device, it must be able to utilize the data provided by that device. This means that a computer which itself normally operates in one particular data format must be able to communicate with peripheral devices which potentially operate in other formats. Normally, the ability to communicate with peripheral devices operating in other formats is accomplished by devising special (ad hoc) arrangements which are built into the peripheral devices for converting information furnished in a native format to the format of the computer. Each such arrangement is adapted to handle a particular format conversion. Consequently, when a piece of peripheral equipment operating in a particular format is to be used with a particular computer system, circuitry must be provided for accomplishing the format conversion before the equipment can be utilized. This design and the inclusion of the format transfer circuitry may increase the cost of the peripheral equipment significantly. Often, this means that the two pieces of equipment are never used together.

The method of arbitration used by an interconnect is often a significant bottleneck for the system. Typically, arbitration requires that all of the components having data to be transferred must suspend operation and wait until they have been selected to transfer data. This significantly slows the operation of the system. This problem is particularly acute when one device is significantly slower than the rest of the system. Whenever the slow device is active, all of the other devices must wait until the transaction is complete.

In the normal operation of a computer system, some data is more critical than other data. It is important that the arbitration method take this into account. The problem is particularly challenging because both important and unimportant information can come from a single device at different times. This makes it desirable that the relative importance of a transfer can be specified particularly for that transfer. This ideal is in sharp contrast to the common practice of fixing the importance of data based upon the device from which it originates.

In addition to these problems, others arise which are discussed in the following detailed description of the present invention.

FIG. 2 illustrates in block diagram form an interconnect arrangement in accordance with this invention which overcomes the limits of a bus system and solves the problems referred to above. FIG. 2 illustrates a computer system 20 which includes an interconnect 21 arranged to join four individual components 23, 24, 26, and 27 of the computer system 20. In any particular computer system 20, the components 23, 24, 26, and 27 may be any one of a number of individual components such as the central processing unit, other processors, a frame buffer, main memory, a peripheral component, or other component well known to those skilled in the art. In the particular system 20, only two of those components 23 and 24 are identified for illustration purposes as the central processing unit and the frame buffer of the system. In general, as will be understood from the explanation which follows, the interconnect 21 is a complementary interconnect for a system which utilizes a bus arrangement, such as that shown in FIG. 1, as a primary interconnect between certain components of the system. The system may also use directly connected buses between particularly closely associated system components such as the central processor and main memory. The interconnect 21, while used as a complementary interconnect, is usually utilized to transfer very rapidly very large amounts of information between system components of a variety which can only be guessed at during design. On the other hand, the primary system interconnect may be designed to function within a known environment and be optimized for dealing with the details of the particular devices of that environment.

The interconnect 21 is arranged to provide direct connections between each of the major components 23, 24, 26, and 27 whether those be primary components of the computer system 20 or other components such as peripheral devices which may be arranged to cooperate with the system. To accomplish this connection, the interconnect 21 includes a plurality of interface circuits 29 each positioned between the particular component 23, 24, 26, and 27 and the interconnect 21 (at what is hereinafter referred to as a node) to provide any translation necessary from the format used by the component sending the information to that required by the component receiving the information, in this case the interconnect itself. By using interface circuits 29 which accomplish format translation automatically, a peripheral device providing information in any of a number of standard formats may be used with the interconnect 21 without itself possessing the capability to accomplish the translation between formats. Thus, inexpensive peripheral devices need not incorporate format translation circuitry in order to be used with the system. On the other hand, the cost of providing format translation circuitry in the interconnect of the present invention is substantially less than for peripheral devices. Where the complexity of designing a large custom integrated circuit has already been undertaken and materials may be purchased in volume, the additional functionality of the translation circuitry adds little to the overall cost.

Interface circuitry for accomplishing such translation is disclosed in U.S. patent application Ser. No. 07/815,828, U.S. Pat. No. 5,410,677 entitled *APPARATUS FOR PROVIDING A POLYMORPHIC INTERFACE*, Roskowski et al, filed on even date herewith, and assigned to the assignee of the present invention (hereinafter referred to as the Interface Reference). The details of that patent application are hereby incorporated by reference in this specification, and a copy of the specification of the Interface reference is included in the Appendix to this specification.

As is described in that patent application, each of the interface circuits 29 of the preferred embodiment provides the ability to translate between any of five different standard formats used in the computer industry. The five formats include a sixty-four bit data word multiplexed with a thirty-two bit address, a thirty-two bit data word multiplexed with a thirty-two bit address, and three formats with in which address and data are transferred on separate buses. The address used in these formats is always thirty-two bits wide, while the data is transferred, respectively, in groups which are thirty-two, sixteen, and eight bits wide.

In the preferred embodiment of the invention, the interconnect 21 utilizes the sixty-four bit multiplexed format as an internal format. Thus, the interface circuit 29 connecting each component 23, 24, 26, and 27 to the interconnect 21 furnishes data to the interconnect 21 from such component in the sixty-four bit multiplexed format. Each interface circuit 29 includes two translation channels, one channel directed from the component connected at the node to the interface 21 and one channel directed from the interface 21 to the component. The channel from the interface 21 to the particular component translates data from the internal format of the interconnect 21 to the format of the particular component if the data is not already in that format.

It will be understood by those skilled in the art that bits of valid data in one of the above-mentioned formats when presented at the input pins of such an interface will appear at different input pin positions than those bits of data will appear in another of those formats. For example, data furnished by a source in a sixteen bit separate format which is to be translated to a sixty-four bit multiplexed format must have its first sixteen bits placed in the first two byte positions of the sixty-four bit format, its second sixteen bits placed in the third and fourth byte positions of the sixty-four bit format, and so on to fill the sixty-four bit positions available. Moreover, in the sixteen bit format, each two bytes will be addressed to a single individual address indicating the first bit of the first of the two bytes. In the sixty-four bit format, all eight bytes will be addressed to a single address indicating the first bit of the first of the eight bytes. Thus, the individual addresses for each two bytes in the sixteen bit format must be changed to a single address for the entire sixty-four bits of the second format. Thus, it is required that the translation circuitry be able to select from the data presented the next data to be used in that format and place it in the correct position in another format while providing consistent addresses in the second format.

The translation circuitry takes the data in whatever byte order it is presented by the source component, selects the appropriate number of bytes of data for use by the destination, and accomplishes the transfer of data from one byte lane position to another byte lane position automatically. Since the address for data always appears in the same thirty-two bit positions, the translation circuitry allows byte aligned transfers of data of any format size to be made to a simple peripheral component which has no circuitry dedicated to the problem. The details of this translation are described at length in the Interface Reference.

In order to allow transmission between all of the nodes of the interconnect 21, each node of the interconnect has a plurality of buffers each of which stores information from the component connected at the node. In the specific implementation, four individual buffers 31 are provided at each node. In this manner, a component connected at a node has a buffer available which may be allocated to store data which is to be written to any of the components connected at the other nodes. At least one buffer at each node is reserved for read response operations from the component at the node ordered by another of the components in order to reduce the system latency caused by read operations. The manner in which this buffer selection is accomplished is discussed hereinafter with respect to FIG. 5.

Each of the buffers 31 at a node in a preferred embodiment is capable of holding up to sixty-four bytes of data in sixty-four bit word lines. A separate address buffer 32 is associated with each of the data buffers 31. The data is loaded into one of the buffers 31 by the interface circuitry 29 so that it may be transmitted to another component of the computer as a packet. To load a packet, a component 23 first sends an address which is stored in the associated address buffer 32. The component proceeds in loading the packet by transferring up to sixty-four bytes of data. The component indicates completion by asserting a "done" signal. As will become apparent, the use of these buffers 31 at each node allows each component associated with the interconnect to place a packet of data in a buffer for the interconnect to handle and then return to its own tasks. This appreciably speeds the operation of the interconnect and the system with which it is associated since no component need stop operation and wait for the data it desires to transmit to be accepted by the system arbitration apparatus. Moreover, when this packetizing arrangement is joined with the novel synchronization circuitry described hereafter, the arrangement allows the system component at each node to run asynchronously with respect to any other system component without requiring the inordinate time for synchronization normally expected of asynchronous systems.

Each of the nodes has an individual data path 34 to each other node of the interconnect 21. Each individual data path 34 is wide enough (sixty-four bits in the preferred embodiment) for transmitting data in the internal format of the interconnect 21. Each of the buffers 31 at a node may be connected to any of these data paths 34 by means of a multiplexor so that it may furnish the packet of information stored in the buffer to any one of the other nodes. Each data path 34 essentially originates at the buffers 31 of a node where a packet of data is supplied and terminates at the interface 29 which connects to the component to which the information is addressed. At this interface 29, the destination component provides any information necessary to the interface so that the interface may accomplish any translation of the data from the internal format of the interconnect to the format of the destination component using the circuitry of the interface 29.

Controlling the operation of transferring data between the components 23, 24, 26, and 27 of the computer system 20 are a plurality of routers 33, one router 33 at each node of the interconnect 21. Each router 33 receives from the component connected at that node by way of the interface circuit 29 information describing a particular transfer of data which is to take place. This information (called a header) describes the destination component, the type of arbitration to be used (under source or destination control) and the importance of the data, the type of operation (read, write, or read response), the amount of data if the operation is a read, and certain other house-keeping information. A description of the bit format of a header used in a preferred embodiment of the invention is illustrated in FIG. 4. The use of each portion of the header information is described in detail in the following specification and in the co-pending patent applications referred to in this specification. It should be noted that the header information does not describe the bit format used by the component connected at the node since the translation to the internal format of the interconnect 21 is automatically accomplished by the interface circuitry 29.

The basic operation of the interconnect 21 takes place in response to a header valid signal from the component connected at the node (the source component) sent through the interface circuit 29 to the associated router 33. The signal indicates that the component signalling has a packet of information that it desires to transfer to another component (the destination component) or that it desires to read information that exists on another component. On receipt of such a signal, the associated router 33 determines whether there is a buffer free which may be used to store the packet. The selection of a buffer 31 is accomplished by a circuit 50 which is described in detail in FIG. 5 hereinafter. If a buffer 31 is free for use, the router 33 places the header information in one of a plurality of header buffers 35 (shown in FIG. 3) in the router 33 at the node which is the source of the data, selects an empty source buffer 31 in the associated node for the packet of data which is to be transferred, and waits for a "done" signal indicating that the component has loaded the packet to be transferred. The generation of the "done" signal is explained in detail in the Interface Reference.

The source router 33 then initiates the operations necessary to transfer the packet to its destination. The first thing that the router 33 does is to send header information to the other nodes to indicate that there is data waiting to be transmitted. The router 33 must choose among the different headers stored in the header buffers 31 based on a selection technique which transfers first read response data packets, next packets with a priority assigned by the source component, and last packets based on selected by the destination component. The selection is accomplished by priority arbitration and order circuit 39. The details of the header selection technique and the circuitry for accomplishing it are described in detail below and is U.S. patent application Ser. No. 07/815,694, still pending, entitled *APPARATUS FOR MAINTAINING ORDER AND ACCOMPLISHING PRIORITY PROMOTION IN A COMPUTER INTERCONNECT*, Roskowski et al, filed on even date herewith, and assigned to the assignee hereof (hereinafter referred to as the Order Reference). The details of that patent application are hereby incorporated by reference in this specification, and a copy of the specification of the Order Reference is included as a part of the Appendix hereto.

Once the selection of the packet the transfer of which is to be initiated has been completed, the router 33 sends most of the information about the data packet (which is stored in the header buffer) plus the source buffer identification on a launch bus 36 connected to all of the other routers 33. This information is clocked out in synchronization with the clock of the source component. In the preferred embodiment, an individual launch bus 36 connects each router 33 to each other router 33. Thus, each router 33 at a destination node is connected to three launch buses 36, one joining to each of the other routers 33. As will be seen, each router 33 is also connected to each other router 33 by a reply bus 37. The header information on the launch bus 36 from the source node is synchronized to the clock of the destination component and stored by the router 33 associated with the destination component to which the packet is addressed. The header information is stored in a destination header buffer dedicated to the sending node and to the particular buffer at the sending node containing the packet of data to be sent. Thus, in an interconnect 21 having four nodes, each router 33 will have twelve destination header buffers, each for receiving the header information defining the data contained in a specific one of the data buffers 31 at a particular source node. If the data is stored in buffer two of a source node A, then the header information goes into the destination header buffer two representing node A at the destination node.

On each clock cycle of the destination component, the router 83 at the destination node evaluates the header information stored in each of the destination header buffers and selects the header representing data which is to be next used at the destination component. This is accomplished by evaluating simultaneously whether any read responses are ready to be processed, the availability of data to be arbitrated on the basis of source-assigned importance (called "priority data") and the highest level of such data available for transfer, and the availability of data to be arbitrated on the basis of destination-assigned importance (called "stream data"). The results of each of these three simultaneous determinations are presented to circuitry which selects one packet from all of the available data packets.

The manner of the selection in the interconnect 21 is as follows. A read response automatically has the highest precedence and is handled before any other data so that the inherent latency of read operations is shortened as much as possible. If no read response header is present, then the selection circuitry looks to see if "priority data" is available. As explained, priority data is data to which the source of the information has assigned a priority. Finally, if priority data is not available, the selection circuitry looks to see if "stream data" is available. Again, stream data is data the transfer order of which may be selected by the destination component rather than the source component.

The selection of which priority data header is presented to the selection circuitry is determined on a highest priority basis by circuitry included within the priority arbitration and order circuit 39. If more than one header has the same highest priority, then a round robin basis is used for selecting the preferred header buffer. U.S. Pat. No. 5,257,385, entitled *APPARATUS FOR PROVIDING PRIORITY ARBITRATION IN A COMPUTER SYSTEM INTERCONNECT*, Roskowski et al, issued Oct. 26, 1993, and assigned to the assignee hereof (hereinafter referred to as the Priority Arbitration Reference), describes circuitry for determining priority and selection on the basis of priority. The details of that patent application are hereby incorporated by reference in this specification, and a copy of the specification of the Priority Arbitration Reference is included in the Appendix to this specification. This system of priority arbitration is much more useful than is the typical system in which, for example, data from a particular component is always chosen to be transferred first.

The selection of which stream data header is presented to the selection circuitry is determined by "stream number." Stream data is given a stream number to allow its order of transfer to be determined by the destination component in cases in which such selection is useful. While the usual method of determining the order in which data is transferred in this system depends upon the priority assigned to the data by the source, it is often the case that the use of certain data by a component depends upon the availability of other data from another component of the system. This is particularly true in more advanced computer systems which are capable of presenting or utilizing information from a number of sources simultaneously. For example, if a computer display is to present a video image such as a television picture in a window on its output display at the same time it is presenting background information related to another computer program on the same display, the video information will probably be furnished by an external source while the information determining where and how the video information is to be displayed will be furnished by a program being run on the central processor of the computer system. Thus, the use of data from a first source depends upon the availability of data from a second source. Such data interrelations are called data dependencies.

It is often the case where data dependencies are involved that a source of data will have determined that its data is of a high priority while another source will have determined its data is of a lower priority, yet the actual data needed by the destination component is the lower priority data. Since the priority arbitration circuitry selects the data to be sent based on source determinations of priority, this situation can cause a system deadlock in which the operation cannot be carried out. Such a deadlock is usually resolved in a busing arrangement by the generation of error signals which cause the system to throw out the existing arbitration requests and begin over again. Such a deadlock at the very least slows the operation of the system and at the worst causes the system to cease operating. The present system allows the destination component to resolve such problems by selecting the stream of data it desires.

The selection ability of the selection circuitry is enhanced by the use of a skip signal which may be generated by the destination component to cause the data which would normally be chosen based on its precedence to be skipped over when other data is desired by the destination component. The skip signal allows read responses to be skipped one at a time, all priority data to be skipped together, and streams to be skipped one at a time. Using this signal the destination component can select the data it desires to have transferred to it. U.S. patent application Ser. No. 07/815,816, now abandoned, entitled *APPARATUS FOR CONTROLLING THE FLOW OF DATA THROUGH A COMPUTER INTERCONNECT BASED ON THE REQUIREMENTS OF A DESTINATION COMPONENT*, Roskowski et al, filed on even date herewith, and assigned to the assignee hereof (hereinafter referred to as the Stream Arbitration Reference), discloses circuitry for determining the order of use of data based on stream numbers and the use of the skip signal. The details of that patent application are hereby incorporated by reference in this specification, and a copy of the specification of the Stream Arbitration Reference is included in the Appendix to this specification.

Once the data to be transferred is determined, the destination router 33 signals the destination component through the interface 29 that a packet of data is ready to be transmitted to it. It does this by transmitting the identification of the source of the packet, the priority of the data, the type of transaction (whether read, write, or read response), and the amount of data in the packet if the transaction is a read operation. It also asserts a HeaderValidOut signal to indicate that the header is there. The destination router 33 also configures the data path to present the related packet to the associated component.

This is done by transferring to the multiplexors the source number and buffer number of the appropriate packet. Details of the arbitration operations are discussed at length in each of the Priority Arbitration and Stream Arbitration References and hereinafter with respect to FIGS. 3.

When the data is sent by the source node, the entire packet is sent, sixty-four bits at a time until the entire packet has been sent. The address is the first part of each packet transmitted. The data path knows the packet is complete when it has transferred the proper amount of data and informs the destination router 33. This accomplished by subtracting from the byte size of the data packet the amount transferred until the amount remaining is zero; the details of this operation are described in the Interface Reference. The destination router 33 sends back a "completed" signal plus the status of completion on the reply bus 37 to the source router 33a. Each destination router has three reply buses 37, one connecting to each node in a structure similar to the launch buses 36. Upon receipt of the complete signal, the source router causes the source buffer 31 in which the data was stored to be marked as free. This is accomplished by marking the header for the packet stored in the source header buffer as invalid. The Order Reference describes in detail the use of the various bits stored in each header buffer.

When the transaction is a read operation, the packet loaded into the source buffer contains only an address, and the source router 33 receives a done signal after the single address word is loaded. The header for a read request has a priority assigned so the read request is handled at the source router as a priority packet. The source router 33 sends the header information and the source buffer identification to the destination router. At the destination router, the header is stored in a destination header buffer, goes through the synchronization process, and finally finds its way to the priority arbitration process. Here, the header is selected depending on its priority; and, when selected, its header information (source node and buffer, read type and size) is transferred to the destination component. The destination component receives the address, and the destination node goes into a packet-creating mode which is the same as that for creating a packet on a write operation.

FIG. 5 illustrates the individual components of a circuit 50 of FIG. 3 which is used in the preferred embodiment of the invention for selecting buffers 31 at a source node (or a destination node in the case of a read response). An OR gate 52 receives four input signals and produces an output indicating a read response operation exists if any of the input signals is high. The input signals to the OR gate 52 are furnished from a plurality of AND gates 53(0–3). Each AND gate 53 receives a signal indicating the validity of the header stored in a particular header buffer (as determined from the valid bit) and a signal indicating whether the header indicates a read response packet (as indicated by the type bits in the header). If any header holds a valid read response signal, the OR gate 52 produces an ARR signal indicating the presence of a read response.

The circuit 50 also includes an adder circuit 55 which adds together the number of valid bits included within all of the header buffers and provides a three bit output indicating how many of the buffers 23 store valid headers and, thus, are in use.

A counter 57 in the circuit 50 at each node receives an indication from any new header transferred to that destination and counts up by one if the header is for a packet which requests a read operation. The counter 57 also receives a signal each time a new packet sent from the node is a read response packet. In this manner, each node keeps track of the number of outstanding read requests to that node which have not been answered, and produces a three bit output signal indicating this number.

The circuit 50 includes an adder 58 which adds the number of buffers in use at the node (using the value provided by the adder 55) and the number of buffers reserved for read responses (using the value provided by the counter 57). The adder 58 produces an output signal Alloc indicating the number of storage buffers which have been allocated for any use at each node.

The signal Alloc provided by the adder 58 indicating the number of buffers which have been allocated is furnished to a comparator 60. If the number allocated is less than four, a high value signal is sent as an input to an AND gate 62. The other input to the AND gate 62 is provided by an OR gate 63. The OR gate 63 receives a signal from a comparator 65. The comparator 65 receives the output signal from the adder 55 and provides a high signal (to generate a source buffer available signal SBA from the AND gate 62) if less than three buffers 31 are in use. Thus, if two buffers 31 are free, only one need be retained for read responses. The OR gate 63 also receives a signal from a comparator 66 indicating that the read reserved signal (indicating the number of unfilled read requests) from the counter 57 is greater than one. Thus, the OR gate 63 transfers a high signal to cause the AND gate 62 to generate a source buffer available signal SBA if the number of read requests is greater than the number of read responses answered by the destination component and not all of the storage buffers 31 are allocated. Finally, the OR gate 63 produces a high value as input to the AND gate 62 if at least one of the header buffers already holds a read response header.

The result of this allocation scheme is that unless a header already stored in a header buffer represents a read response packet, or a buffer is already allocated for a read response, or two buffers are available, no new buffer can be allocated. Thus, one of the source buffers at the destination node remains available at all times to be allocated to handle the read operation; this buffer remains available to receive the packet of data to be read from the destination component even though the destination component is not yet ready to transfer the data. The reserved buffer at the destination node is ultimately filled with the desired data, and the data path asserts a complete signal. The header for this read response operation is immediately sent on the launch bus 36 for arbitration at the original source. The selection of the specific buffer 31 and the details of the selection of the particular header to transfer to the destination component are explained in detail in the Order Reference. The destination arbitration circuitry at the original source node selects the read response data packet to be next transferred (a read response operation having the highest priority) by the data path to the interface 29 at the source node. The details of priority and stream arbitration are described in the Priority Arbitration and Stream Arbitration References.

In order to speed the transfer of the data in the invention, the router 33 at a destination node does two things related to system timing. First, it routes the clock of the destination component back to the source buffer 31 so that the packet of data is read out of the source buffer 31 in response to the clock of the destination component. This allows the information in the source buffer to be transferred to the destination component without the necessity of a synchronization at both of the interfaces 29 separating the components. In FIG. 3, a multiplexor 41 is illustrated for transferring the clock to be used for clocking out the data stored in a source buffer 31. The manner in which this is accomplished is described in detail in U.S. patent application Ser. No. 07/815,696, now abandoned, entitled *ARRANGEMENT FOR INCREASING DATA TRANSFER SPEED BETWEEN ASYNCHRONOUS COMPUTER SYSTEM COMPONENTS*, Roskowski, filed on even date herewith and assigned to the assignee of the present invention (hereinafter referred to as the Speed Reference). The details of that patent application are hereby incorporated by reference in this specification, and a copy of the specification of the Speed Reference is included in the Appendix to this specification.

The value of this routing back of the destination clock is very significant. It is always necessary when transferring digital signals across an interface between two system components which operate at different clock frequencies that the incoming signals which are synchronized to the clock of the source component be synchronized to the clock of the destination component so that the information may be properly interpreted by the destination component. This would typically require approximately two clock periods of the destination component to synchronize the data for transfer across the interface. Moreover, the typical system does not transfer data in packets but in words. Thus, systems in which different components function in response to different clocks (asynchronously) typically require that synchronization be accomplished for each word of data transferred across a system interface such as the interface 29. In the system of this invention using the synchronization arrangement described in the Speed Reference, only a single synchronization is required for an entire packet to cross two interfaces 29.

The fact that data is transferred between system components in packets, rather than in word groups, allows this rapid synchronization to take place. The entire packet of data may be transferred from the source component using the source clock and accumulated in the source buffer. When the packet is complete, the header signal is sent to the destination component in synchronization with the clock of the source component. A bit from this header signal is synchronized to the clock of the destination component in the typical fashion (using double rank synchronization) and requires the typical time to synchronize and transfer. However, this is the only synchronization required. The header signal indicates to the destination component that the data at the source has all been gathered in the buffer and that no operation is presently taking place with regard to that packet of information. Since the receipt of the synchronization signal by the destination component indicates that the clock of the source component is not active with regard to the information in the source buffer, it allows the clock of the destination component to be switched to the terminals of the source buffer which normally receive the clock of the source component.

The packet of data may then be transferred from the source buffer for use by the destination component without any synchronization being necessary to the transfer. The data is simply clocked out by the clock of the destination component and is thereby automatically synchronized to the clock of the destination component. The source buffer is simply treated as though it were a buffer of the destination node when the data is transferred out. This substantially reduces the time required to transfer data over an interconnect between two components running on different clocks.

A second manner in which the router 33 at the destination node speeds the transfer is by routing back the clock of the destination component immediately upon an arbitration selection being accomplished by the destination router arbitration circuitry. In this way, the source is ready so that the data packet may be written from the source buffer to the destination component as soon as the destination component signals that it can handle the data. No time is lost waiting for the destination clock to be routed back after the destination component is ready, and the operation of the interconnect 21 is substantially accelerated.

Because the interconnect 21 handles all information from the various components of the system 20 in packets, the time related to a transfer of the packet (such as routing and synchronization) is shared by all of the data involved in the transfer. This substantially reduces the overall transfer time. Moreover, the transfer of information in packets also allows significant optimization for write operations. The source component may transfer its packet of data to a buffer, signal that the packet is ready to be transmitted, and move on to the next operation without waiting for a reply. No other operation by the source component is required; the interconnect handles everything from that point. The only time that a reply is generated is when an error occurs. This is significantly more efficient for the source component than the typical operation over a system bus. This built in pipelining of write operations makes the interconnect particularly well suited for moving large blocks of data in conjunction with a DMA system.

For example, in the system illustrated in FIG. 2, since each individual system component may be directly connected to each of the other system components by a data path to that component, each of these data paths may be transmitting information at the same time. The component at the node labeled A in the figure may transfer different information to each of the nodes labeled B, C, and D simultaneously. At the same time, the components at the nodes B, C, and D may also be transmitting different data to each of the other components. In essence, any component can talk to any other component without interfering with any other transmission. Each data transmission path is sixty-four bits wide and is designed to run at above fifty Mhz. in a preferred embodiment. Consequently, each component may be sending or receiving up to four hundred megabytes per second. Thus, while a typical bus such as Nubus used in the Macintosh line of computers manufactured by Apple Computer of Cupertino, Calif., might allow the transmission of thirty-six megabytes of data per second, the interconnect of the present invention is designed to allow the transmission of up to 800 megabytes of data per second where the interconnect resides between four components of the system. It will be understood by those skilled in the art that this is a significant improvement in transmission bandwidth. Further, as more nodes are added, the system bandwidth increases so that six nodes provides a bandwidth of 1.2 gigabytes while eight nodes provides 1.6 gigabytes of bandwidth.

Referring now to FIG. 3, there is illustrated in substantial detail a portion of an interconnect 21 shown in Figure which is designed in accordance with the invention. Some portions of FIG. 3 have already been discussed in substantial detail above with respect to FIG. 2. The portion illustrated in FIG. 3 includes the circuitry utilized at one node A for sourcing a packet of information and at another node B for receiving a packet of information, essentially the circuitry required to send packets of data in one direction only between two of the system components. All of the similar circuitry at those nodes for sending packets of data in the other direction and for sending packets of information to and from other nodes has been eliminated from FIG. 3 in order to make the description more understandable.

At the node A which initiates a transfer are included a first interface 29a, a set of four source buffers 31a individually referred to as buffers 0 through 3, and the source portion of a router 33a. At the destination node B are included a second interface 29b, and the destination portion of a router 33b. Within the router 33a are included four individual source header buffers 35 in which are stored the header information related to the packets of information stored in the source buffers 31a. Also included in the router 33a is a full comparator 38 which is used with circuitry 39 to determine the order of operation by the source router and to promote the priority order of source determined priority packets in order to relieve certain system deadlocks. The details of these operations are discussed in detail in the Order Reference. In addition, each source router 33a includes the circuit 50 used in the manner described above to allocate header buffers and data buffers at a source node.

Within the router 33b are included three destination header buffers 40a, 40c, and 40d. Each header buffer is connected via a launch bus 36 to the source portion of a router 33 of one of the other nodes so that the particular header buffer serves to store header information only from a single node. Each header buffer 40 is divided into four individual buffers 0–3 each of which is used for storing information transferred to it from only a single one of the buffers 0–3 of one of the source header buffers 35. Also included in the destination router 33b is an arbitration circuit 42 for determining which of the competing packets at the various nodes is to be first transferred based on priority or stream number and a latch 43 for receiving the information relating to the selected header to be transferred to the destination component. A response module 44 also resides in the router 33b for signalling the source nodes regarding the completion of transmission of data. As outlined above, although not shown, the circuitry for sending data at the node A is duplicated at node B; and the circuitry for receiving data at node B is duplicated at node A.

FIG. 6 is a flow chart which outlines the transfer of a packet of data from a source component joined to the interconnect at node A to another destination component joined to the interconnect at the node B. The steps of this flow chart outline in broad detail the steps which are explained in the following description. The flow chart should aid the understanding of the operation of the interconnect because the written description cannot proceed in the same logical order as the chart but must consider items in serial order.

As explained above, when the source component has a packet of information to send to the destination component, a header must be transferred by the source component through the interface 29a to the router 33a. This header will then be held by the router 33a in a source header buffer 35 for launch on the launch bus 36. The router 33a understands the presence of the header at the interface 29a (prefaced by a header valid signal) to mean that a packet is ready to be launched and selects an empty data buffer 0–3 from the four buffers 31a to receive the data using the circuit 50. To do this, the router tests an in-use bit of each header (the valid bit) in the header buffers to determine if any of the source buffers are empty. If a source buffer is empty, the router 33a signals the interface 29a; and the header is transferred into the source header buffer 35 while the data begins the process of format translation (if necessary) through the interface 29a and transfer into the selected source buffer 31a (for this explanation, buffer 0 will be presumed to have been selected) where it is stored in sixty-four bit wide words (the process is described in the Interface Reference). The address to which the data is directed is separately stored in the associated address buffer 32. The data may include in the preferred embodiment up to sixty-four bytes of data. A counter 45 assists in loading the data in first-in first out order into the buffer; and the state of the buffer, including the size of the packet, is included in a register 47. When the end of the packet is reached, either because sixty-four bytes have been transferred or because a smaller packet is complete, the component sends a "done" signal to the interface 29a. This signal is sent on to the router 33a as well as to the selected buffer. The generation of the "done" signal is explained in detail in the Interface Reference; it may be accomplished in the preferred embodiment by placing the number of bytes in a packet in the counter 45 and subtracting the number of bytes in each transfer until the number is counted to zero.

When the router 33a receives the "done" signal, it may launch the header on the launch bus 36 to the destination node (which is presumed to be node B for this explanation).

The details of the order in which different headers are selected for launching are described in the Order Reference. One controlling factor is that the system requires that only one packet of data of a particular priority or from a particular stream directed to any one destination component be outstanding from any one source of data at any one time. In order to assure this occurs, the router 33a stores age information with each header in the source header buffers. The age information is compared for each priority and destination (or stream and destination) before any header is launched. When any comparison shows another packet of the same priority (or stream) headed for the same destination, the eldest packet is so marked. In this manner, the destination component is only informed of the presence of the eldest header for any priority (or stream); and data order within any priority level (or stream number) is maintained.

This launching of only a single packet of a given priority or stream from any node to any one destination is accomplished through the use of a launch bit stored in each source header buffer 35. The launch bit indicates whether the header information has been launched or not. If the information has not been launched and the header is the oldest of its priority (or stream) type, it is launchable. On each cycle of operation, the router 33a looks first for a read response type header; if one is present and launchable, it is launched. If no read response header exists, the router looks next for a priority type header; if one is present and launchable, it is launched. If no priority type header exists, the router looks next for a "stream" type header; if one is present and launchable, it is launched. Once launched, the launch bit for the header in that source header buffer 35 is set. The launch bit precludes any other header of the same type having the same priority (stream) and directed to the same node from being launched. This assures that the order of launching is maintained and that only one header of any priority and type may be launched from any source node to any one destination. The Order Reference describes the details of this launching and order-maintaining circuitry.

The header information (approximately twenty bits in the preferred embodiment) is received at the router 33b and stored in the buffer 40a thereof in the individual buffer 0. Thus the header describing the packet stored in source buffer 0 of the sources buffers 31a at node A is stored in header buffer 0 of destination buffer 40a. As may be seen from FIG. 3, the destination header buffer 40c is connected by a launch bus 36 to the node C; and the destination header buffer 40d is connected by a launch bus 36 to the node D. Thus, the header information in a particular destination header buffer refers only to a packet contained in a particular source buffer at a particular node.

When the header data arrives at the destination header buffer, a single bit of the information is synchronized to the clock of the destination component preferably using a pair of flip-flops to accomplish double rank synchronization. This assures that the header information is synchronized to the clock of the destination component. This requires approximately two clock cycles to accomplish. The manner in which this is accomplished is explained in the Speed Reference. Thus, each destination header buffer 40a, 40c, and 40d includes header information synchronized to the clock of the destination component and includes a valid bit indicating that the synchronization has taken place.

The use of twelve individual destination header buffers allows each node to communicate simultaneously with each other node. Thus, each node may know that any source buffer contains a packet of data to be transferred to it. The destination router 33b looks at all of the headers stored in the destination header buffers. An arbitration circuit 42 reads the data included in each valid header buffer on each clock cycle of the destination component. The arbitration circuit 42 using a type select circuit 54 determines which header relates to the most important information by considering read response headers to be of highest priority, priority marked headers to be of next priority, and stream numbered headers to be of lowest priority.

If any read response data is waiting to be transferred, it is given highest priority and is transferred first. This is accomplished by a read response arbitration circuit 49 within the arbitration circuit 42. The circuit 49 determines which header relates to the most important read response information by comparing all of the priorities of the header information for all read response packets at a source node. In the preferred embodiment of the invention, there are eight priority levels designated. The circuit 49 first selects the highest priority read response packet available at each source node by comparing the priority values of the read response headers in all of the destination header buffers 40a, 40c, or 40d for the particular source node. The circuitry for accomplishing this may be identical to the circuitry disclosed in the Priority Arbitration Reference for determining the highest priority at each source node. These highest priority read response headers are then chosen on a round robin basis to be presented to the destination component. It will be recalled that by using the skip signal referred to above, the actual order of transfer discussed here may be determined by the destination component even in the face of the prescribed priorities.

If no read response packets are waiting, the results from a priority determination circuit 46 within the arbitration circuit 42 is used. The priority determination circuit 46 determines which header relates to the most important information by comparing all of the priorities of the header information. It will be noted that there can be only a single header of any one priority transferred to any single destination node by the source router 33a because of the order maintaining circuitry at the source nodes. In the preferred embodiment of the invention, there are eight priority levels designated. The priority determination circuit 46 first selects the highest priority packet available at each source node by comparing the priority values of the headers in all of the destination header buffers 40a, 40c, or 40d for the particular source node. The highest priority header from each of the three source nodes is then compared with each of the other highest priority headers from the other source nodes; and the highest priority header of all is selected. If one header is of higher priority than all others, that header is selected. If more than one header of the highest priority exists from different nodes, one of these highest priority headers is chosen on a round robin basis. The Priority Arbitration Reference describes in detail circuitry for accomplishing the above-described arbitration based on source-determined priority.

If the data in the headers show that no read response or priority data are present, then the results from stream arbitration circuitry 48 within the arbitration circuit 42 are presented. The stream arbitration circuitry 48 selects a data packet to be transferred based on the stream number of the data packet. In the preferred embodiment of the invention, eight stream numbers are assigned. The stream arbitration circuitry compares the stream packets available at each source node by comparing the stream numbers of the headers in all of the destination header buffers 40a, 40c, or 40d for the particular source node to the stream number of the last stream packet transferred. The smallest difference in stream numbers provided by these comparisons indicates the next-to-be-transferred stream packet from the particular one of the source nodes. The smallest of these difference values from all of the nodes is then determined by another comparison. If two stream difference values are the same, the stream arbitration circuitry 48 selects the packet at the source node closest (each node being assigned a number) in order to the last node to transfer data.

This has the effect of selecting packets with a first stream number from each source node in order; the circuitry then selects packets with a next highest stream number from each source node in order. This continues through all of the stream numbers. The Stream Arbitration Reference describes in detail circuitry for determining the order in which numbered streams are selected under the control of the destination component for transfer to the destination component. It also describes the use of the skip signal to take any packet of information whether a read response, a priority packet, or a stream packet out of the normal selection order. The skip signal helps to resolve conflicts between the different forms of arbitration.

The system used by the order determining circuitry at the source router 33a (discussed above) guarantees that if one component attempts to send two packets of the same priority (or stream number) to the same node at the same time, the earliest will be handled first. If a packet of a given priority (or stream number) has been launched to a node, the router 33a will not launch a new header to that node for that priority (or stream number) level. Once the interface 29b commits to the first packet at that priority, however, an early acknowledge signal is sent back to the source router. This signal causes the bits indicating the outstanding launch for the node to be cleared so that a new header at that priority (or stream) may launched. The details of this operation are described in the Order Reference.

The header for the data packet selected by the arbitration circuit 42 for transmission is transferred to the latch 43 and sent to the interface 29b for transfer to the destination component in the manner described in the Priority Arbitration and Stream Arbitration References. The header information transferred includes the source buffer identification, the priority (or stream) of the data, and the type of transfer. Up to this point, both read and write operations are the same. At the same time that the header information is first transferred to the destination component, the configuration of the data path described above causes the clock of the destination component to be routed back to the source buffer 31a even though the packet has not yet been accepted by the destination component. In this manner, the clock is available if the packet is immediately transferred to the destination component. The circuitry and the operation by which the clock from the destination component is routed to the source node are described in detail in the Speed Reference. When the destination clock has been so routed, the data path asserts a signal (data here) indicating that the packet is ready to be transferred. The information in the latch 43 remains until the packet is accepted by the destination component.

The destination component in due course typically accepts the header information and commits to accomplishing that transfer. Assuming that the destination component commits to take the packet, an early acknowledge signal is sent by the response module 44 which indicates that the destination component is committed to the packet. This early acknowledge signal contains essentially the information contained in the original header and allows the source node to identify the accepted packet of data. The launch of the early acknowledge signal is essentially the same as the launch of a header; the signal is placed on the response bus, synchronized by the sources, the address recognized, and accepted at the source node. This early acknowledge signal allows the source node to quickly indicate that the packet has been selected for transfer. The early acknowledge signal is used at the source node to generate an accept bit which is stored in the header buffer for the packet. The accept bit is used (as described in the Order Reference) so that headers for additional packets of the same priority or stream number may be launched from that node.

In general, in response to this early acknowledge signal, the accept bit is set in the header at the source node so that the priority of the packet which has been accepted is no longer considered in deciding which new header to launch. In this manner, another packet and header of that priority (or stream number) may be transferred from the source component to the source node to vie for transmission to the destination component. This essentially allows the header for the next packet of that priority to be launched to the destination node if it is of the highest precedence at the source node. Since only one header at any priority level can have been launched by the source node to a particular destination, this allows the source node to begin another launch of a header which may be of the same priority as that just accepted before the transfer of the first packet is complete. The time required for the header launch, synchronization, and arbitration at the destination is thus pipelined with the actual transfer of the packet of data which has been accepted. In fact, in the preferred embodiment, a header for the same priority may be transferred and selected by the destination router arbitration circuitry during the packet transfer so that a second packet of the same priority may be selected and transmission begun of that second packet with only one clock pulse of delay after the first packet has ended.

In the case of a write operation, the data is then transferred from the source buffer directly to the interface 29b. The interface 29b converts the data into the correct format for the destination component, if necessary, and transfers the data to the destination component in the manner described in the Interface Reference.

When the data packet has been transferred to the component, the destination component sees an end of packet signal; and a second response is sent by the response module 44 on the reply bus to clear the buffer at the source node. This second response indicates the actual end of the transfer, and all state associated with the transaction at both source and destination is cleared by clearing the valid bit in the particular header buffer at both the source and the destination node.

It should be noted that the transmission of a first signal on the reply bus when the destination component has committed to the transmission of a packet of data and a second signal on the reply bus when the packet ends, allows pipe-lining of the packets with only one clock cycle being lost. This allows the source component to immediately clear the state blocking further packets of data of the same priority so that an additional data packet of that priority may be received. It also allows the buffer to be immediately used for new data packets once the transfer of a packet is complete. This facility assists in accelerating the transmission of data. In fact, in the preferred embodiment of the invention, during eight clock cycles out of ten, data is being transmitted, an extremely high transfer efficiency.

If the transaction is a read operation, the header information in the latch 43 at the destination node indicates this fact, indicates the amount of data to be read in bytes, and gives the identification of the source node. The source buffer holds the address at which the information is to be read. The packet is thus a zero length data packet. The information in the latch 43 is presented to the interface 29b and the destination component. The router 33b allocates an empty one of its source buffers for accomplishing the read operation in the manner described above with respect to the circuit 50 and in the Order Reference. As explained, in the preferred embodiment, only three of the four source buffers at any node may be allocated at any instant for storing write packets. This allows at least one source buffer to be ready to accept a read response and helps relieve any deadlocks in the system which might be caused by a requirement for information to be read before a write could be accomplished.

The data path is apprised of the read by this action and of the amount of data in the read operation through the information contained in the type bits. When the destination component elects to accomplish the read, the address is transmitted from the node requesting the read as the only information in the packet. As soon as the destination component elects to accept the read operation, the response module 44 sends the early acknowledge signal which removes the packet from consideration on a priority basis at the source buffer holding the address so that like priority operations may be accomplished by the source node.

When the address is received by the destination component and the destination component obtains the data which is to be transferred back to the source component, the router 33b causes the interface 29b to route the data read from the destination component to the reserved source buffer in the manner described in the Interface Reference using the buffer selection technique described above and in the Order Reference. When the data of the read packet has accumulated in the source buffer at the destination component, the source portion of the router 33b (which is not shown but is the same as that illustrated for router 33a) selects the read response header for launching and launches a header on the launch bus to the source node indicating that a read response is ready to be sent. The read response is sent to the destination header buffers of the source node and Synchronized. The arbitration circuit 42 at the source node picks a read response as its highest priority and latches the information into its latch 43. The source node then transfers the data in the read source buffer at the destination node to the interface 29a of the source node. The end of packet signal is detected by the router at the source node, and the response module 44 sends a signal to release the source buffer at the destination node used for the read packet.

In the preferred embodiment of the invention, the interconnect can either complete a read once it is started without any interference in the manner described or it can split the read operations. The first operation is self explanatory and has been detailed; the destination component and the data path to the source component source buffer are occupied with accomplishing the read operation during the time a read is occurring. No other operation can be accomplished by the destination component until the read operation is completed. A split read response occurs when the destination component indicates that it is splitting the transfer. If the destination component decides to do a split read, when it decides to take the read information from the latch 43, the destination component takes the read address, latches the header information within the destination component, and then releases the interconnect by sending both the early acknowledge signal and the signal indicating a packet transfer is complete. The interconnect releases all information it has about the read operation except that it continues to allocate a source buffer at the destination component for the read packet. The interconnect can then do any processing it wants until the destination component is ready with the read response packet. When the destination component has the read data, it transfers it to the reserved buffer. The operation is handled entirely as a write operation except that the header defines the packet type as a read response. Thus, it will be seen that the presence of both an early acknowledge and a packet transfer complete signal allows split reads to be accomplished.

In order to provide very rapid operation, the interconnect 21 allows each node to accept data from a plurality of sources. However, as has been pointed out, this requires that only one packet of data of a particular priority be presented from any one source of data to the arbitration circuitry 42 at any node at any one time. Because a number of different packets of data of the same priority may be available simultaneously at a source node and only one may be presented for arbitration, it is necessary to maintain the correct order of the data packets offered at a particular priority level by a source component. Unless order is maintained, data within the same priority level which would normally be expected to appear later than other data within the same priority level may appear before other data necessary to its use.

The router 33a of the present invention accomplishes this by setting a launch bit in the particular header buffer 35 once a header has been launched. Before any other header for a packet of the same type (priority, read response) addressed to the same node with the same priority is launched, a test is made for an outstanding launch bit. The launch bit precludes any other header in the storage area of the same type having the same priority and directed to the same node from being launched. This assures that the order of launching is maintained and that only one header of any priority and type may be outstanding (launched but not completed) from any source node to any one destination.

Since the interconnect is capable of arbitrating the transfer of information for write operations based not only on source-defined priority but also on a determination made at the destination, the router also compares the stream designators, along with the destination address and the type of operation, in the same manner as headers for data packets whose arbitration is based on priorities to maintain the order of transfer of data from the source to the destination node. Thus, only a single packet of a particular stream number may be launched to a particular destination from a particular node; and this packet will be the oldest packet of that stream number. In this manner, the described circuitry maintains order for stream packets as well as priority packets. The circuitry for accomplishing this order maintenance is detailed in the Order Reference.

Since there are a limited number of storage buffers to hold data at each source, it is possible for the storage space to be filled with low priority (less important) data packets. These low priority data packets in the source buffers can block access by higher priority (more important and should be handled first) data packets so that the arbitration circuitry at the destination does not know of their existence. Since the lower priority data packets will not be transferred while higher priority packets from other source nodes have access to the arbitration circuitry, those higher priority packets which are blocked and do not have access to the arbitration circuitry remain blocked so that the arbitration circuitry is not aware of the existence of the higher priority data. So long as higher priority data is available from some other node, the low priority data will continue to block access to the priority arbitration circuitry by the hidden but higher priority data. Such a blockage in the operation of any computer system can cause the system to fail due to a lack of performance.

The router 33a eliminates blockages of this sort by a process called promotion. The process senses when data of a higher priority is blocked by data packets of lower priority and promotes the priority of the packet of low priority data having the highest priority to the level of the data being blocked. Since the promoted low priority data is labelled as high priority data, it will be handled out of order and thereby provide access to the arbitration circuitry for the blocked higher priority data. Where there are a number of packets of blocking data having the same low priority level, the process selects the oldest highest priority for promotion so that the order of the data within a priority level is maintained even though the priority level of a particular packet is raised. Once promoted, the header is relaunched so that the new priority is sent to the destination component.

As explained, when the transfer of a data packet is completed from a source node to a destination node, a signal is returned to the source node. This signal invalidates the header information related to the completed packet so that header information for another packet may be transferred into the particular header buffer and a new packet of data into a source buffer.

An especially important aspect of the invention will be noted by those skilled in the art. Since the oldest header of the highest priority available at a source node is always chosen for priority promotion, the fact of promotion has no effect on the order in which the information available at the source node is presented. Even though the particular packet may be presented sooner than packets of higher priority, it is presented in the same order as it would otherwise have appeared with respect to packets of its own priority from the same node. Thus, order is maintained even though priority values are promoted.

The details of the circuitry of the router 33 for maintaining order and promoting the priority of data packets in order to eliminate deadlocks are described in the Order Reference.

Although the present invention has been described in terms of a preferred embodiment, it will be appreciated that various modifications and alterations might be made by those skilled in the art without departing from the spirit and scope of the invention. For example, there may be situations in which it is desirable to make operations other than write operations depend upon the content of the data involved. The invention should therefore be measured in terms of the claims which follow.

What is claimed is:

1. In a computer system having a first component and a second component, a computer interconnect for transferring packets of data between the first and second components, the computer interconnect comprising:

a first launch bus;

a first node coupled to the first component;

a second node coupled to the second component, wherein the first node includes:

a first buffer coupled to the first component for storing a first data packet received from the first component;

a first router coupled to the first launch bus and the first component, the first router for storing a first header associated with the first data packet, the first router for transferring the first header to the second node via the first launch bus at a first clock speed of the first component, the first header indicating that the first data packet exists for transfer to the second node;

a first data path coupled to the first buffer and the second node for transferring the first data packet from the first buffer to the second node at a second clock speed of the second component.

2. In a computer system having a first component and a second component, a computer interconnect for transferring packets of data between the first and second components, the computer interconnect comprising:

a first launch bus;

a first node coupled to the first component;

a second node coupled to the second component, wherein the first node includes:

a first buffer coupled to the first component for storing a first data packet received from the first component;

a first router coupled to the first launch bus and the first component, the first router for storing a first header associated with the first data packet, the first router for transferring the first header to the second node at a first clock speed of the first component, the first header indicating that the first data packet exists for transfer to the second component;

a first data path coupled to the first buffer and the Second component for transferring the first data packet from the first buffer to the second component at a second clock speed of the second component, and wherein the second node comprises:

a second router coupled to the launch bus and the second component, the second router for storing the first header; and a first reply bus coupled to the first router and the second router for transferring a first signal from the second router to the first router, the first signal indicating that transfer of the first data packet from the first buffer to the second component is complete.

3. The computer interconnect of claim 2, wherein the second router comprises:

a first circuit coupled to the first launch bus for receiving the first header and for determining whether the second node can accept data from the first node;

a destination header buffer for storing the first header if the first circuit determines that the second node can accept data from the first node.

4. The computer interconnect of claim 2, wherein the first header includes:

destination information describing the second component as a destination of the first data packet;

arbitration information describing a type of arbitration to be used;

priority information describing priority of the first data packet;

operation information describing a type of operation; and amount information describing an amount of data in the first data packet to be transferred.

5. The computer interconnect of claim 2, wherein the second node further comprises:

a second buffer coupled to the second component for storing a second data packet received from the second component; and a second data path coupled to the second buffer and the first component for transferring the second data packet from the second buffer to the first component at the first clock speed, wherein the second router is for storing a second header associated with the second data packet, the second router for transferring the second header to the first node at the second clock speed, the second header indicating that the second data packet exists for transfer to the first component.

6. The computer interconnect of claim 5, wherein the first node transmits the first data packet to the second component simultaneously with transmission of the second data packet from the second node to the first component.

7. The computer interconnect of claim 5, wherein the first data path and the second data path uni-directional.

8. A computer system comprising:

a first component;

a second component;

a primary computer interconnect coupled to the first and second components; and a complementary computer interconnect coupled to the first and second components comprising:

a first launch bus;

a first node coupled to the first component;

a second node coupled to the second component, wherein the first node includes:

a first buffer coupled to the first component for storing a first data packet received from the first component;

a first router coupled to the first launch bus and the first component, the first router for storing a first header associated with the first data packet, the first router for transferring the first header to the second node at a first clock speed of the first component, the first header indicating that the first data packet exists for transfer to the second component;

a first data path coupled to the first buffer and the second component for transferring the first data packet from the first buffer to the second component at a second clock speed of the second component.

9. In a computer system having a first component and a second component, a computer interconnect for transferring data between the first and second components, the computer interconnect comprising:

a first launch bus;

a first node coupled to the first component;

a second node coupled to the second component, wherein the first node includes:
- a first interface circuit coupled to the first component for transferring signals between the first component and the first node;
- a first buffer coupled to the first interface circuit for storing data received from the first component;
- a first router coupled to the first launch bus and the first interface circuit, the first router for signaling to the second node at a first clock speed of the first component that data exists for transfer to the second component;
- a first data path coupled to the first buffer and the second node for transferring data from the first buffer to the second node at a second clock speed of the second component;

the second node includes:
- a second interface circuit coupled to the second component for transferring signals between the second component and the second node;
- a second buffer coupled to the second interface circuit for storing data received from the second component;
- a second router coupled to the first launch bus and the second interface circuit, the second router for signaling to the first node at the second clock speed of the second component that data exists for transfer to the first component; and
- a second data path coupled to the second buffer for transferring data from the second buffer to the first node at the first clock speed of the first component.

10. The computer interconnect of claim 9, wherein the first node further includes:
- a first reply bus coupled to the first router and the second router for transferring a first signal from the second router to the first router, the first signal indicating that data transfer from the first buffer to the second component is complete.

11. The computer interconnect of claim 10, wherein the first interface circuit includes:
- a first translation channel for translating data in a first format received from the first component to a second format;
- a second translation channel for translating data in the second format to the first format for transfer to the first component.

12. The computer interconnect of claim 11, wherein the first format is one of a plurality of formats.

13. The computer interconnect of claim 12, wherein the plurality of formats include at least one format in which addresses and data are multiplexed and at least one format in which addresses and data appear separately.

14. The computer interconnect of claim 13 wherein the second format is an internal format of the computer interconnect.

15. The computer interconnect of claim 9 wherein the first buffer comprises a plurality of first data buffers for storing packets of data received from the first component.

16. The computer interconnect of claim 15, wherein at least one of the plurality of data buffers is reserved for read response operations.

17. The computer interconnect of claim 15, wherein the first buffer further comprises a plurality of first address buffers, each of the plurality of first address buffers for storing an address associated with data stored in a corresponding one of the plurality of first data buffers.

18. The computer interconnect of claim 17, wherein the first router is for sending a first header to the second node via the first launch bus to indicate that a first data packet stored in a selected one of the plurality of first data buffers is to be transferred to the second node.

19. The computer interconnect of claim 18, wherein the first header includes:
- destination information describing the second component as a destination of the first data packet;
- arbitration information describing the type of arbitration to be used;
- priority information describing priority of the first data packet;
- operation information describing a type of operation; and
- amount information describing an amount of data in the first data packet to be transferred.

20. The computer interconnect of claim 19, wherein the second router comprises:
- a first circuit coupled to the first launch bus for receiving the header and for determining whether the second node can accept data from the first node;
- a destination header buffer for storing the first header if the first circuit determines that the second node can accept data from the first node.

21. The computer interconnect of claim 20, wherein the second buffer comprises a plurality of second data buffers and a plurality of second address buffers, each of the plurality of second address buffers for storing an address associated with data stored in a corresponding one of the plurality of second data buffers.

22. The computer interconnect of claim 21, wherein said destination header buffer comprises a first destination header buffer which stores the first header and a second destination header buffer which stores a second header, the second header indicating a second data packet, the second router further comprising:
- priority arbitration circuit for selecting either the first data packet or the second data packet to be transferred to the second node in response to the first header and the second header.

23. The computer interconnect of claim 22 wherein the priority arbitration circuit selects the first data packet for transfer if a priority of the first data packet is a highest priority.

24. The computer interconnect of claim 23, wherein the priority arbitration selects either the first data packet or the second data packet for transfer on a round robin basis if the first and second data packets are of equal priority.

25. The computer interconnect of claim 22, wherein the priority arbitration circuit selectively promotes the priority of the first data packet.

26. The computer interconnect of claim 25, wherein the second router transmits the first signal via the reply bus in response to a transfer of the first data packet being complete.

27. The computer interconnect of claim 26, wherein the first data path and the second data path are uni-directional.

28. The computer interconnect of claim 27, wherein the first node is capable of transferring data to the second node while simultaneously receiving data from the second node.

29. The computer interconnect of claim 28, wherein the computer includes a system bus as a primary computer interconnect such that the computer interconnect is a complementary interconnect.

30. The computer interconnect of claim 9, wherein the first and second components are a processor and a memory, respectively.

31. The computer interconnect of claim 30, wherein the memory is a frame buffer memory.

32. The computer interconnect of claim 30, wherein the memory is a random access memory.

33. The computer interconnect of claim 9, wherein the first and second components are both processors.

34. The computer interconnect of claim 9, wherein the first and second components are a first memory and a second memory, respectively.

35. The computer interconnect of claim 9, wherein the first and second components are a processor and a first peripheral component, respectively.

36. The computer interconnect of claim 9, wherein the first and second components are both peripheral components.

37. The computer interconnect of claim 9, wherein the first and second components are a memory and a peripheral component, respectively.

38. The computer interconnect of claim 9, wherein the first data path and the second data path are uni-directional.

39. The computer interconnect of claim 9, wherein the first node is capable of transferring data to the second node while simultaneously receiving data from the second node.

40. The computer interconnect of claim 39, wherein a system bus is a primary computer interconnect for the computer and the computer interconnect is a complementary interconnect.

41. In a computer system having a first component, a second component, and a third component, wherein each of the first, second and third components are components which are typically joined to a system bus, a computer interconnect for transferring a plurality of packets of data simultaneously between individual ones of the first, second and third components, the computer interconnect comprising:

a first launch bus;

a first node coupled to the first component;

a second node coupled to the second component;

a third node coupled to the third component, wherein the first node includes:

a first interface circuit coupled to the first component for transferring signals between the first component and the first node;

a first buffer coupled to the first interface circuit for storing data received from the first component;

a first router coupled to the first launch bus and the first interface circuit, the first router for signaling to the second node at a first clock speed of the first component that data exists for transfer to the second component, and for signaling to the third node at the first clock speed that data exists for transfer to the third component;

a first data path coupled to the first buffer and the second node for transferring data from the first buffer to the second node at a second clock speed of the second component;

a second data path coupled to the first buffer and the third node for transferring data from the first buffer to the third node at a third clock speed of the third component;

the second node includes:

a second interface circuit coupled to the second component for transferring signals between the second component and the second node;

a second buffer coupled to the second interface circuit for storing data received from the second component;

a second router coupled to the first launch bus and the second interface circuit, the second router for signaling to the first node at the second clock speed that data exists for transfer to the first component, and for signaling to the third node at the second clock speed that data exists for transfer to the third component;

a third data path coupled to the second buffer and the first node for transferring data from the second buffer to the first node at the first clock speed;

a fourth data path coupled to the second buffer and the third node for transferring data from the second buffer to the third node at the third clock speed;

the third node includes:

a third interface circuit coupled to the third component for transferring signals between the third component and the third node;

a third buffer coupled to the third interface circuit for storing data received from the third component;

a third router coupled to the first launch bus and the third interface circuit, the third router for signaling to the first node at the third clock speed that data exists for transfer to the first component; and for signaling to the second node at the third clock speed that data exists for transfer to the second component;

a fifth data path coupled to the third buffer and the first node for transferring data from the third buffer to the first node at the first clock speed;

a sixth data path coupled to the third buffer and the second node for transferring data from the third buffer to the second node at the third clock speed.

42. The computer interconnect of claim 41, wherein the first node further includes:

a first reply bus coupled to the first router and the second router for transferring a first signal from the second router to the first router, the first signal indicating that data transfer from the first buffer to the second component is complete;

a second reply bus coupled to the first router and the third router for transferring a second signal from the third router to the first router, the second signal indicating that data transfer from the first buffer to the third component is complete.

43. The computer interconnect of claim 42, wherein the first interface circuit includes:

a first translation channel for translating data in a first format received from the first component to a second format;

a second translation channel for translating data in the second format to the first format for transfer to the first component.

44. The computer interconnect of claim 43, wherein the first format is one of a plurality of formats.

45. The computer interconnect of claim 44, wherein the plurality of formats include at least one format in which addresses and data are multiplexed and at least one format in which addresses and data appear separately.

46. The computer interconnect of claim 45 wherein the second format is an internal format of the computer interconnect.

47. The computer interconnect of claim 41 wherein the first buffer comprises a plurality of first data buffers for storing packets of data received from the first component.

48. The computer interconnect of claim 47, wherein at least one of the plurality of data buffers is reserved for read response operations.

49. The computer interconnect of claim 47, wherein the first buffer further comprises a plurality of first address buffers, each of the plurality of first address buffers for storing an address associated with data stored in a corresponding one of the plurality of first data buffers.

50. The computer interconnect of claim 49, wherein the first router is for sending a first header to the second node via the first launch bus to indicate that a first data packet stored in a selected one of the plurality of data buffers is to be transferred to the second node, and for sending a second header to the third node via the first launch bus to indicate that a second data packet stored in a selected one of the plurality of first data buffers is to be transferred to the third node.

51. The computer interconnect of claim 50, wherein the first header includes:
  destination information describing the second component as a destination of the first data packet;
  arbitration information describing the type of arbitration to be used;
  priority information describing priority of the first data packet;
  operation information describing a type of operation; and
  amount information describing an amount of data in said first data packet to be transferred.

52. The computer interconnect of claim 51, wherein the second router comprises:
  a first circuit coupled to the first launch bus for receiving the first header and for determining whether the second node can accept data from the first node;
  a plurality of destination header buffers, each of the plurality of destination header buffers for storing the first header if the first circuit determines that the second node can accept data from the first node.

53. The computer interconnect of claim 52, wherein the second buffer comprises a plurality of second data buffers and a plurality of second address buffers, each of the plurality of second address buffers for storing an address associated with data stored in a corresponding one of the plurality of second data buffers.

54. The computer interconnect of claim 53, wherein a first destination header buffer stores the first header and a second destination header buffer stores a third header, the third header indicating a third data packet received from the third node via the first launch bus, the second router further comprising:
  priority arbitration circuit for selecting either the first data packet or the third data packet to be transferred to the second node in response to the first header and the third header.

55. The computer interconnect of claim 54 wherein the priority arbitration circuit selects the first data packet for transfer if a priority of the first data packet is a highest priority.

56. The computer interconnect of claim 54, wherein the priority arbitration selects either the first data packet or the third data packet for transfer on a round robin basis if the first and third data packets are of equal priority.

57. The computer interconnect of claim 56, wherein the priority arbitration circuit selectively promotes the priority of the first data packet.

58. The computer interconnect of claim 57, wherein the second router transmits the first signal via the reply bus in response to a transfer of the first data packet being complete.

59. The computer interconnect of claim 58, wherein the first data path and the second data path are uni-directional.

60. The computer interconnect of claim 59, wherein the first node is capable of transferring data to the second node while simultaneously receiving data from the second node.

61. The computer interconnect of claim 60, wherein the computer includes a system bus as a primary computer interconnect such that the computer interconnect is a complementary interconnect.

62. The computer interconnect of claim 41, wherein the first and second components are a processor and a memory, respectively.

63. The computer interconnect of claim 62, wherein the memory is a frame buffer memory.

64. The computer interconnect of claim 62, wherein the memory is a random access memory.

65. The computer interconnect of claim 41, wherein the first and second components are both processors.

66. The computer interconnect of claim 41, wherein the first and second components are a first memory and a second memory, respectively.

67. The computer interconnect of claim 41, wherein the first and second components are a processor and a first peripheral component, respectively.

68. The computer interconnect of claim 41, wherein the first and second components are both peripheral components.

69. The computer interconnect of claim 41, wherein the first and second components are a memory and a peripheral component, respectively.

70. The computer interconnect of claim 41, wherein the first data path and the second data path are uni-directional.

71. The computer interconnect of claim 41, wherein the first node is capable of transferring data to the second node while simultaneously receiving data from the second node.

72. The computer interconnect of claim 41, wherein a system bus is a primary computer interconnect for the computer and the computer interconnect is a complementary interconnect.

* * * * *